(12) United States Patent
Voss et al.

(10) Patent No.: US 11,341,245 B1
(45) Date of Patent: May 24, 2022

(54) SECURE DELIVERY OF SOFTWARE UPDATES TO AN ISOLATED RECOVERY ENVIRONMENT

(71) Applicant: EMC IP Holding Company LLC, Hopkinton, MA (US)

(72) Inventors: Stefan Voss, Milton, MA (US); Sadagopan Balaraman, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 270 days.

(21) Appl. No.: 16/441,397

(22) Filed: Jun. 14, 2019

(51) Int. Cl.
| | |
|---|---|
| *G06F 11/30* | (2006.01) |
| *G06F 12/14* | (2006.01) |
| *G06F 21/57* | (2013.01) |
| *G06F 21/60* | (2013.01) |
| *G06F 11/14* | (2006.01) |
| *G06F 21/53* | (2013.01) |

(52) U.S. Cl.
CPC ........ *G06F 21/572* (2013.01); *G06F 11/1446* (2013.01); *G06F 21/53* (2013.01); *G06F 21/604* (2013.01)

(58) Field of Classification Search
CPC ...... G06F 21/572; G06F 21/604; G06F 21/53; G06F 11/1446
See application file for complete search history.

(56) References Cited

U.S. PATENT DOCUMENTS

| | | | | |
|---|---|---|---|---|
| 8,666,938 | B1* | 3/2014 | Pancholy | G06F 11/1484 707/610 |
| 2008/0016387 | A1* | 1/2008 | Bensinger | G06F 11/1464 714/4.11 |
| 2011/0060722 | A1* | 3/2011 | Li | G06F 16/122 707/649 |
| 2011/0225217 | A1* | 9/2011 | Plax | G06F 16/2282 707/825 |
| 2014/0033193 | A1* | 1/2014 | Palaniappan | G06F 21/57 717/173 |
| 2014/0101111 | A1* | 4/2014 | Sengupta | G06F 11/2094 707/654 |
| 2016/0179498 | A1* | 6/2016 | Das | G06F 8/65 717/171 |
| 2016/0378527 | A1* | 12/2016 | Zamir | G06F 3/0665 711/162 |
| 2018/0024893 | A1* | 1/2018 | Sella | G06N 7/005 707/648 |
| 2019/0087278 | A1* | 3/2019 | Almog | G06F 8/41 |
| 2019/0339958 | A1* | 11/2019 | Joshi | G06F 11/1417 |

* cited by examiner

*Primary Examiner* — Trong H Nguyen
(74) *Attorney, Agent, or Firm* — Dergosits & Noah LLP; Todd A. Noah

(57) ABSTRACT

Described is a system that provides a mechanism to securely deliver software updates to components of an isolated recovery environment. More specifically, the system provides the ability to include (or inject) a software update as part of a secure data transmission from a production environment to an isolated recovery environment. The data transmission may use existing infrastructure for synchronizing recovery data between the production backup system and isolated recovery system thereby preventing a potential new access point (or vulnerability) to the isolated recovery environment that a cyber security threat may attempt to exploit.

20 Claims, 4 Drawing Sheets

SECURE DELIVERY OF SOFTWARE UPDATES TO AN ISOLATED RECOVERY ENVIRONMENT

TECHNICAL FIELD

This disclosure relates to managing an isolated recovery environment, and more particularly, a mechanism to securely deliver updates to components within the isolated recovery environment.

BACKGROUND

A data backup and recovery system may provide various tools that are crucial for enterprise level network clients. Clients may rely on such systems to efficiently back up and recover data in the event of user error, data loss, system outages, hardware failure, or other catastrophic events to allow business applications to remain in service or quickly come back up to service. These systems may include recovery infrastructure including resources to recovery components of a production environment. For example, when components of a production backup system need to be recovered or restored, these components may first be created within a secure (e.g. "air-gapped") recovery environment before being deployed to a production environment. As with all computing systems, the recovery infrastructure must be concerned with various cyber security threats. For example, cyber security threats such as malware or ransomware have relied on various attack vectors to infiltrate systems. For example, an attack vector may include a path or means by which a malicious party (e.g. hacker) can gain access to a computer or network and deliver a payload that exploits system vulnerabilities. Indeed, current products exist that attempt to protect against various cyber security threats. However, applying various counter-measures such as security patches often increases the breadth (or surface area) for potential attack vectors to the secure recovery environment. Accordingly, there is a continued need to minimize the susceptibility of recovery infrastructure to potential cyber-attack vectors.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
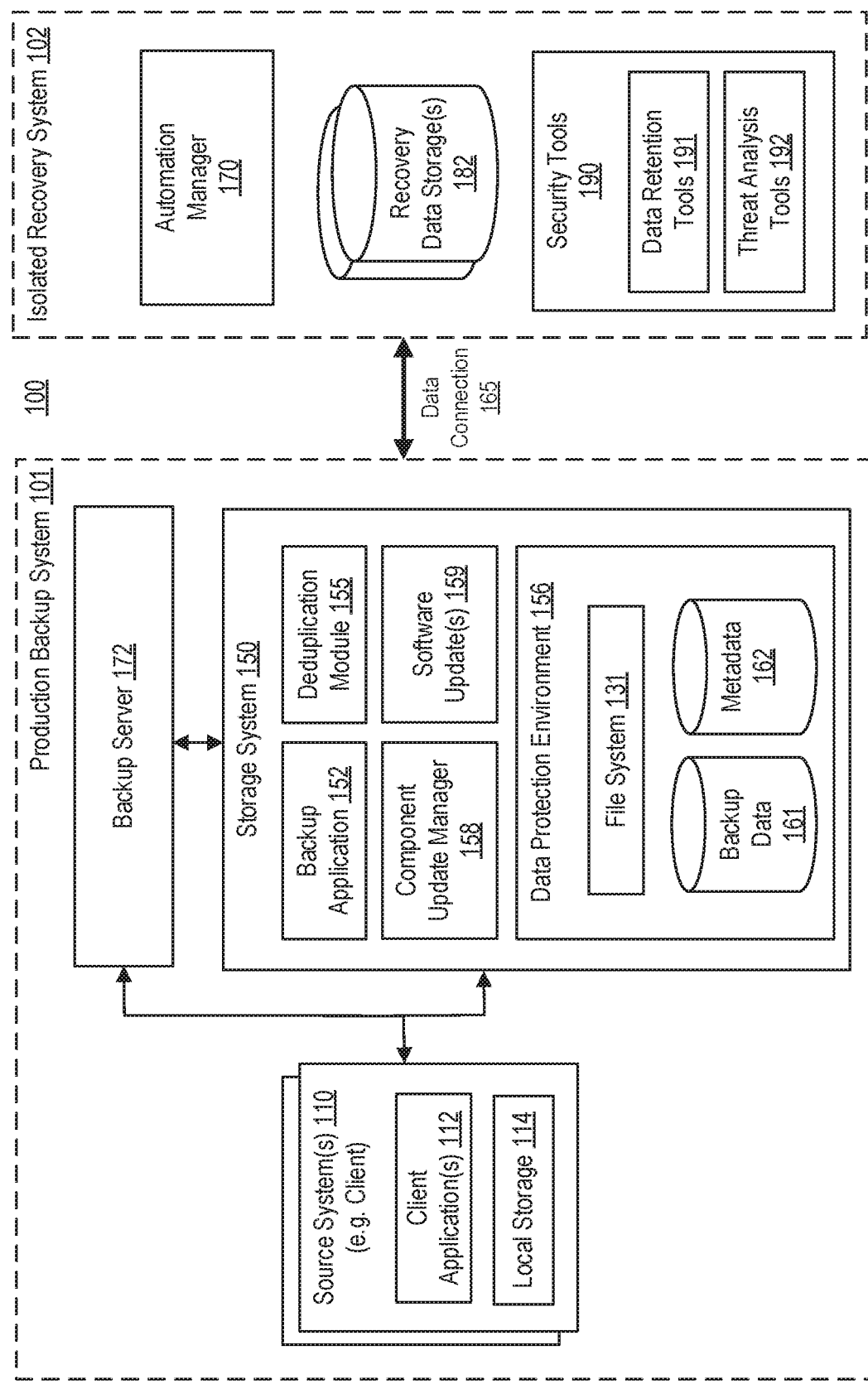
FIG. 1 is a block diagram illustrating an example of an operating environment that may be used in conjunction with one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) that provides a mechanism to securely deliver software updates to components of an isolated recovery environment (or dark site, cyber-recovery vault, etc.). For example, the system provides the ability to include (or inject) a software update as part of a secure data transmission from a production environment to an isolated recovery environment. In some embodiments, the data transmission may use existing infrastructure for synchronizing recovery data between a production backup system and an isolated recovery system. By using an existing data recovery infrastructure, the mechanism prevents introducing a potentially new access point (or vulnerability) to the isolated recovery environment that a cyber security threat may attempt to exploit.

To provide such capabilities, the system may leverage a configuration that securely transmits data to a recovery environment, For example, in some embodiments, the system may receive a data transmission including a software update for a component of the isolated recovery system. In some embodiments, the production backup system may perform a first validation of the software update before the data transmission is initiated. For example, the data transmission may be performed as part of a process to synchronize recovery data between the production backup system and the isolated recovery system. Accordingly, the software update may be included with the recovery data as a payload of the data transmission. The isolated recovery system may store the software update as part of a target data protection storage and apply a retention lock to the stored software update. The system may then restore the software update to a sandboxed environment and perform a second validation of the software update before applying the software update to the component of isolated recovery system.

In addition, the system may automate such a procedure from a secured automation component within the isolated system. By utilizing the automation component of the secure and isolated environment, a security threat cannot access the automation component even if the threat is aware of such a component. Accordingly, in some embodiments, described is a mechanism that minimizes the breath of potential attack vectors when updating components of a recovery system.

In some embodiments, such a system may be provided within an operating environment. An example of such an operating environment is further described herein with reference to FIG. 1. However, in general, embodiments of the disclosure may include and/or be implemented in an operating environment including a cloud services environment that may be, or include, a data protection operating environment that includes a storage environment including primary storage and data protection storage. For example, at least some functionality may be provided by, or implemented in connection with, various platforms such as the Dell/EMC Data Domain™ data protection platform, and associated systems, methods, and components, although use of this particular platform is provided only by way of illustration and is not required.

In one embodiment, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as other types of data stores. The applications on the clients may generate new and/or modified data that is desired to be protected.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

More specifically, and with reference to FIG. 1, shown is a block diagram illustrating an example of an operating environment 100 for securely providing software updates to recovery infrastructure according to one or more embodiments of the disclosure. As shown, the environment 100 may include a production backup system 101 and an isolated recovery system 102. The production backup system 101 may include components that are live and/or used for providing services by the customer (or client) of a backup and data protection service (or storage service). For example, the production backup system 101 may include a source system 110 that provides computing resources (e.g. webservers, databases, etc.) for users (e.g. website visitors) of the customer of the backup and data protection service. It should be noted that the components of operating environment 100 may interact via a network, which may be any type of wired or wireless network including a local area network (LAN), a wide area network (WAN), or a direct communication link, or other suitable connection. In some embodiments, the production backup system 101 may be connected to the isolated recovery system 102 via a data connection 165 which may be intelligently activated or deactivated. For example, to minimize the breadth of potential attack vectors, components of the production backup system 101 (e.g. storage system 150, backup server 172, etc.) may only be allowed access to the isolated recovery system 102 during the window of time that the data connection is activated. The data connection 165 may be any suitable wired or wireless network (or data) connection. In some embodiments, the data connection 165 may be a particular network port such as a replication port. In addition, the data connection 165 may be the only data connection between the two systems. In addition, in some embodiments, the data connection 165 may be the only network connection from a system external to the isolated recovery system 102.

As shown, the operating environment 100 may include a client or source system (or computer, or device) 110 that may be associated with a customer of a service, and a storage system 150 that may be associated with a service provider. In some embodiments, the source system 110 may act as a client from which backups are performed. In some embodiments, the source system 110 may comprise a virtual machine. The source system (or computer, device, etc.) 110 may host one or more client applications 112, and may include local storage 114, as well as an interface for communicating with other systems and devices, such as the storage system 150. In general, the client applications 112 may create new and/or modified data that is desired to be protected. As such, the source system 110 is an example of a host device. The local storage 114 can be used to locally store data, which may, along with the source system 110 itself be backed up using the storage system 150. The backed-up data can be restored to the local storage 114. The source system 110 may include a backup client application that cooperates with storage system 150, to create backups of client data, which may include backup data 161. As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc.

In one embodiment, storage system 150 may represent one or more components of a Data Domain™ Restorer (DDR)-based deduplication storage system, and backup server 172 may be implemented in conjunction with a Data Domain deduplication storage server provided by Dell/EMC™ Corporation for use with DDR storage devices. For example, the backup server 172 may be a stand-alone entity, or can be an element of the environment 100. In some embodiments, the backup server 172 may be an EMC Corp. Avamar server or an EMC Corp. Networker server, although no particular server is required, and other backup and storage system configurations are contemplated.

The storage system 150, may include a backup application 152 that performs (or manages, coordinates, etc.) the creation and restoration of critical data that may be backed-up. This data may include backup data of the source system 110, as well as critical data used by components of the production backup system. For example, data to be backed-up from the source system 110 may be communicated from the source system 110 to the backup application 152 for initial processing, after which the processed data is uploaded from the backup application 152 for storage at the data protection environment 156 (e.g. as backup data 161). In some embodiments, the backup application 152 may cooperate with a backup client application of the source system 110 to back up client data to the data protection environment 156. A backup application 152 may also cooperate with a backup client application to restore backup data from the data protection environment 156 to the source system 110. In some embodiments, the storage application 152 may be a part of, or work in conjunction with, a storage appliance. For example, the storage appliance may include a Dell-EMC CloudBoost appliance, although any suitable appliance is contemplated. In addition, the storage application 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the backup application 152 may be performed using deduplication logic via deduplication module 155. For example, the deduplication module 155 can provide data segmentation, as well as in-flight encryption as the data is sent by the storage application 152 to the data protection environment 156.

The production backup system 101 may also include a component update manager 158. The component update manager 158 may validate, and/or manage a software update 159 that is received from a provider. The software update 159 may include software, firmware, or a combination thereof, in the form of a patch (or security patch), update, version upgrade, application, add-on, plugin, library, or various other component to be applied (or provided, installed, distributed, etc.) to a component of the isolated recovery system 102.

The data protection environment (or storage) 156 may store metadata 162 for the backup data 161, and one or more instances of a filesystem 131 that catalogs files and other data residing in the data protection environment 156. In some embodiments, the software update 159 may be stored as part of the data protection environment 156. For example, the software update 159 may be stored in a particular container within the backup data 161 and/or metadata 162 within the data protection environment 156. In general, the storage of backup data 161 may be configured to store source system 110 data backups that can be restored in the event of a loss of data. The term data backups is intended to be construed broadly and includes, but is not limited to, partial backups, incremental backups, full backups, clones, snapshots, any other type of copies of data, and any combination of the foregoing. Any of the foregoing may, or may not, be deduplicated. The storage of data can employ any suitable storage technique, infrastructure, hardware (e.g. Solid State Drive (SSD), Hard Disk Drive (HDD)), or on virtual storage systems provided by a cloud service provider etc.

The isolated recovery system 102 may include an isolated and/or secure environment that is separate from the production backup system 101. In some embodiments, the isolated recovery system 102 may be part of one or more physical servers that are provided as part of a cloud-computing service that is provided by a different entity than the entity that provides the production backup system 101. For example, the production environment 101 may be provided as part of Dell/EMC Data Domain™ data protection platform and the isolated recovery system 102 may be provided by a different entity (e.g. Amazon Web Services (AWS) platform, Microsoft Azure platform, etc.). Accordingly, in some embodiments, the isolated recovery system 102 may be provided as part of a user-account managed by the different entity (e.g. Amazon, Microsoft, etc.). Accordingly, the system described herein may provide the customer with the ability to efficiently and seamlessly interact with the different entity that provides the on-demand infrastructure (e.g. Infrastructure as a Service (IaaS)) for the isolated recovery system 102.

The isolated recovery system 102 may include one or more recovery data storage(s) 182. The recovery data storage (or recovery data protection storage) 182 may store data (or recovery data) used to recover the data protection environment 156 such as the backup data 161 and metadata 162. In addition, the recovery data storage 182 may store copies (e.g. corresponding to various restore points) of a software update 159 to be used to update various components of the isolated recovery system 102. In some embodiments, the software update 159 may also include updates to components of the backup and data protection infrastructure of the production backup system 101 such as the backup application 152 itself, the backup server 172, or other components of the storage system 150. For example, the software update 159 may first be applied, tested, verified, or a combination thereof, within the isolated recovery system 102 before being deployed to components of the production backup system 101. For example, the backup and data protection infrastructure of the production backup system 101 may include components that if compromised (e.g. disabled or otherwise unavailable for use), may prevent the production backup system 101 from performing a recovery procedure. For example, a security threat may not only be aimed at attacking the backup application 152, but also the data protection environment 156 that may store data used to by the production backup system 101 to recover the backup application 152 (or other components) in response to the security threat. Accordingly, the software update 159 may be injected into the isolated recovery system 102 and stored in a protected manner as part of the recovery data storage 182.

The automation manager 170 may coordinate (or manage, orchestrate, automate, etc.) a workflow (or process) for securely applying a software update as further described herein. In some embodiments, the automation manager 170 may perform such a process according to a predefined security policy. For example, the automation manager 170 may determine when a software update is necessary, perform data (including recovery data) synchronization, perform data connection management (activating/deactivating replication ports), restore recovery data, access various security tools, perform testing and verification of software updates, and/or apply software updates to components to the isolated recovery system. As shown, the automation manager 170 may itself be contained within a secure environment (e.g. the isolated recovery system 102), and accordingly, a security threat cannot access the automation manager 170 even if it is aware of such a component. Accordingly, in some embodiments, a software update process as further described herein may be performed in a secure and automated manner by having the coordination managed by a single secure component.

In addition, the isolated recovery system 102 may include various security tools 190. These tools may include various software components, APIs, libraries, classes, etc. to implement additional security features or capabilities within the isolated system. For example, the isolated recovery system 102 may include data retention tools 191. These retention tools 191 may ensure that immutable copies of data remain persistent for a predetermined amount of time. For example, the data retention tools 191 may ensure that all the data (e.g. files) that are locked for a time-based retention period cannot be deleted or overwritten under any circumstances until the retention period expires. To provide such capabilities, the tools may implement various features or policies such as requiring dual sign-on procedures for certain administrative actions. For example, a dual sign-on (or verification) procedure may require a regular system administrator sign-on (or verification) plus a second authorized person (e.g. a "Security Officer") to perform certain administrative operations associated with the locked recovery data. The dual sign-on requirement may ensure that certain administrative actions are under the purview and control of a higher authority above and beyond the system administrator. In addition, the retention tools 191 may also implement various other policies such as disallowing operations that could compromise the state of locked data, securing the system clock from illegal updates, audit logging for any operations that are executed upon the locked data, disabling various "doors" of access that could compromise the state of the locked data or the state of the retention attributes, or other security policies. In some embodiments, the data retention tools 101 may include Dell EMC Data Domain Retention Lock® (DD Retention Lock) components, although any suitable set of tools are contemplated. In some embodiments, retention tools 191 may be compatible with various industry-standards, such as NAS-based (CIFS, NFS) Write-Once-Read-Many (WORM) protocols.

The security tools 190 may also include security threat analysis tools 192. These tools may determine or predict potential security threats to various components of the system. For example, the analysis tools 192 may include various artificial intelligence (AI) tools and/or machine learning components to analyze various statistics and/or behavior within the system to assess the likelihood of any potential security threats. For example, the isolated recover system 102 may even proactively initiate performing a software update as further described herein in response to determining the production backup system 101 and/or isolated recovery system 102 may be exposed to a potential security threat.

As described, the operating environment may provide a mechanism to securely deliver a software update to recovery infrastructure as further described with reference to FIG. 2.

Figure 2:
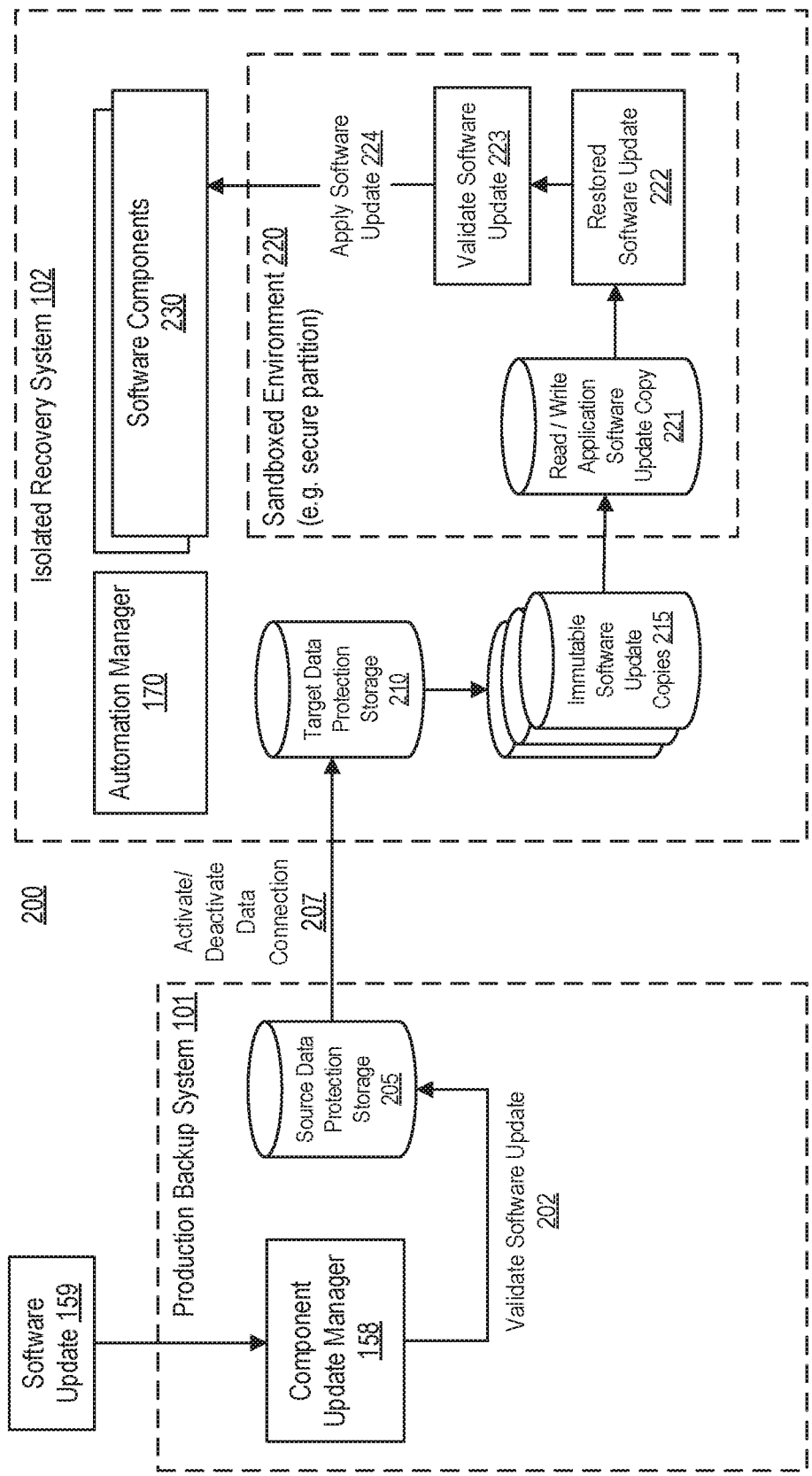
FIG. 2 is a block diagram illustrating an example system for securely providing a software update to components of an isolated recovery system according to one or more embodiments of the disclosure.

FIG. 2 is a block diagram 200 illustrating an example system for securely providing a software update to components of an isolated recovery system according to one or more embodiments of the disclosure. As shown, the backup production system 101 may be provided with a software update 159. The software update 159 may include software, firmware, or a combination thereof in the form of an update, patch (or security patch), version upgrade, application, add-on, plugin, library, or other component to be applied (or provided, installed, distributed, etc.) to a software component of the isolated recovery system 102. For example, the software update 159 may include a security patch for a recovery application, standby (or recovery) backup server, virtual machine, etc., contained within isolated recovery system 102. In some embodiments, the software update 159 may also be applied to components of the production backup system 101. For example, the software update 159 may be securely delivered and applied to a component of the isolated recovery system 102 that is then tested or verified before being deployed to a corresponding (or related) component within the production backup system 101.

In some embodiments, the software update 159 may be provided by a third-party entity (e.g. an entity different from an entity providing the production backup system 101 and/or the isolated recovery system 102). For example, the third-party entity may include a provider of an operating system, virtual machine, backup application, security tool, etc. Although the third-party may generally be trusted, to provide an additional layer of security, the third-party entity may not have direct access to the isolated recovery system 102. Instead, the third-party entity may be required to provide software updates 159 to components of the isolated recovery system 102 indirectly using the production backup system 101 as an intermediary.

As shown, the component update manager 158 of the production backup system 101 may receive the software update 159. The component update manager 158 may perform a code analysis, security scan, version control, or other form of analysis of the received software update 159. As shown, the production backup system 101 (e.g. via the component update manager 158) may validate the software update 202. In some embodiments, the production backup system 101 may perform a first (or initial) validation of the software update 159. The validation may include verifying (determining, ensuring, authenticating, etc.) the software update 159 is received from an authorized source (e.g. third-party provider) and/or has not need been altered in an unauthorized manner. The validation may include performing various forms of authentication associated with the software update 159 and/or the software update provider (e.g. third-party provider). For example, the validation may also include verifying a digital signature, certificate, credential, etc., or any other suitable method to ensure the software update 159 originates from an authorized and intended source. The validation may also include verifying a hash value (or other type of value) associated with the received software update 159 with a hash value provided by the third-party provider of the software update 159.

Once the software update 159 is validated, it may be stored in a secure manner and as part of the source data protection storage 205. In some embodiments, the source data protection storage 205 may be part of the infrastructure (e.g. data protection environment 156) used to securely transmit (or synchronize) recovery data between the production backup system 101 and the isolated recovery system 102. The recovery data may include data used to perform a recovery process (or operation) as part of a data storage and recovery service provided by the production backup system 101. For example, the recovery data may be used to recover backup data (e.g. backup data 161 and/or metadata 162), components of a source system (e.g. source system 110), components of the production backup system 101 (e.g. backup application 152, backup server 172, etc.), or a combination thereof. In addition, to protect against instances where components of the production backup system 101 are comprised, recovery data may also be stored in a target data protection storage 210 of the isolated recovery system 102 to provide an additional redundancy of recovery data that would be inaccessible to a security threat within the production backup system 101.

As shown, the software update may be transferred from the production backup system 101 to the isolated recovery system 102. In some embodiments, this may include transferring the software update from a source data protection storage 205 to a target data protection storage 210. In some embodiments, the system may leverage existing infrastructure for secure data transmission between the production backup system 101 and the isolated recovery system 102.

For example, this infrastructure may include a specialized data connection that is used to transmit recovery data from the production backup system 101 to the isolated recovery system 102. Accordingly, in some embodiments, securely delivering the software update 159 to the isolated recovery system 102 may include using such a data connection. In some embodiments, a backup application (e.g. backup application 152) may coordinate the transfer of the software update 159 to the isolated recovery system 102 as part of a process to synchronize recovery data. By using existing data recovery infrastructure for transmitting data to isolated recovery system 102, the system prevents introducing a new access point (or vulnerability) to the isolated recovery system 102 for a cyber security threat to potentially exploit.

As described, in some embodiments, the software update 159 may be included with recovery data that is transferred to the isolated recovery system 102. For example, the software update 159 may be transferred to the isolated recovery system 102 using an operation (or protocol, process, etc.) used to synchronize recovery data between the production backup system 101 and the isolated recovery system 102. In some embodiments, the data transmission may include the software update 159 and recovery data as the payload for the transmission. Alternatively, in some embodiments, the software update 159 may be transferred to the isolated recovery system 102 independently of recovery data. For example, the software update 159 may be transferred using an operation (or protocol, process, etc.) used to synchronize recovery data between the production backup system 101 and the isolated recovery system 102, but the software update 159 may substitute for (or replace) the recovery data. For instance, a data transmission to synchronize recovery data between the production backup system 101 and the isolated recovery system 102 may include only the software update 159 as the payload for the transmission.

In some embodiments, the software update 159 may be stored in a manner that is indistinguishable from recovery data stored by the isolated recovery system 102. Accordingly, the software update 159 may be afforded the additional layers of security provided to recovery data despite not necessarily being data that is backed-up by the production backup system 101. For example, in one embodiment, the software update 159 may be encapsulated within data structures (e.g. files, data packets, etc.) as part of the recovery data. In addition, in some embodiments, the software update 159 may be stored in a particular (e.g. separate) container within the source data protection storage 205 and/or the target data protection storage 210. In addition, the software update 159 may be stored and associated with a particular identifier.

In some embodiments, the software update 159 may be transmitted to the isolated recovery system 102 based on a synchronization schedule used to synchronize recovery data. For example, the isolated recovery system 102 (e.g. via the automation manager 170) may determine whether synchronization is required based on several criteria. In some embodiments, the automation manager 170 may initiate the synchronization based on a predefined schedule to ensure the recovery data is up-to-date. In some embodiments, the synchronization (e.g. based on a schedule) may be adjusted (e.g. enabled/disabled) based on the potential of a security threat. For example, the automation manager 170 may receive an indication that the production backup system 101 may be exposed to a security threat, and in response, may forgo (or disable, skip, prevent, etc.) the synchronization to avoid potential exposure of the isolated recovery system 102 to the security threat. Accordingly, the isolated recovery system 102 may activate/deactivate the data connection 207 to the production backup system 101. For example, the automation manager 170 may activate (or enable, open, allow access, etc.) a data connection (e.g. data connection 165) between the production backup system 101 and the isolated recovery system 102. To minimize the breadth of potential attack vectors, components of the production backup system 101 (e.g. storage system 150, backup server 172, etc.) may only be allowed access to the isolated recovery system 102 during the window of time that the data connection is activated. In addition, the automation manager 170 may determine when the synchronization (or transmission of the software update) is complete, and in response, may deactivate (or disable, close, deny access, etc.) the data connection. For example, the data connection may be immediately deactivated upon completion of the transfer of data. In some embodiments, the data connection may be the only access path to the isolated recovery system 102 from the production backup system 101. Moreover, the data connection may be the only access point for any external system to the isolated recovery system 102. Accordingly, in some embodiments, deactivating the data connection can effectively close all access paths to the isolated recovery system 102, and thereby effectively avoid potential attack vectors that may originate from an external system.

Once the software update 159 is received by the isolated recovery system 102, it may be stored within the target data protection storage 210. In some embodiments, the software update 159 may be stored along with recovery data stored by the target data protection storage 210. In some embodiments, it may be compressed, encrypted, deduplicated as with recovery data. In one embodiment, it may be stored in a particular (e.g. separate) container within the target data protection storage 210. In addition, the software update 159 may be associated with a particular identifier. For example, the isolated recovery system 102 may parse (traverse, inspect, analyze, etc.) the data received or stored. For example, the isolated recovery system 102 may determine a software update 159 is included as part of the data transmitted to the isolated recovery system 102, and/or stored by the target data protection storage 210. In response to determining the target data protection storage 210 includes the software update 159, the isolated recovery system 102 may initiate a component update process (or operation, procedure, etc.). For example, the automation manager 170 may automatically initiate a component update process to validate, test, and/or apply the software update 159.

As shown, the isolated recovery system 102 may store various versions of the software update 159 as part of a set of immutable software update copies 215. In some embodiments, the isolated recovery system 102 may apply a retention lock to create the set of immutable software update copies 215. In some embodiments, automation manager 170 may manage and/or apply such a retention lock. Accordingly, immutable copies of the software update may be preserved for a predetermined amount of time. In some embodiments, each of the immutable software update copies (or instances) may correspond to a particular restore point based on the time in which the software update 159 was received or transmitted. For example, multiple instances (or versions) of the software update 159 may be created corresponding to a backup schedule (e.g. hourly, daily, etc.). Accordingly, the isolated recovery system 102 may store corresponding instances (e.g. hourly, daily, etc.) of the software update 159 that are created or maintained according to a synchronization schedule. In some embodiments, copies of the software update 159 may be stored in an efficient manner (e.g. deduplicated) by storing only the differences between instances, and accordingly, may also be associated with its own metadata.

To provide an additional layer of security, the system may perform a component update process using a sandboxed environment 220. In some embodiments, the sandboxed (or virtual sandbox) environment 220 may include a secure partition within the isolated recovery system 102. In general, a sandboxed (or isolated, secure, restricted, test, etc.) environment may provide a security mechanism for isolating data or applications and thereby limiting risk to a host machine or operating system. For example, the sandbox may provide a tightly controlled set of resources and restrict access to memory, network, kernel procedures, and other components of the isolated recovery system 102. Accordingly, the sandboxed environment 220 may be used to test software update 159 that may have been exposed to security threats such as viruses, ransomware, or other malicious code.

As part of a component update process, the isolated recovery system 102 (e.g. via the automation manager 170) may first create a read/write software update copy 221. Accordingly, the isolated recovery system 102 may use the readable/writeable software update copy 221 to create a restored software update 222. For example, the software update may be restored within the sandboxed environment 220. In some embodiments, restoring data (e.g. software update) may include rehydrating the data that may be stored in an efficient manner. For example, rehydrating data may include performing processes to reverse various procedures implemented to store such data. For instance, when initially storing the software update 159, the data may be compressed, deduplicated, and/or encrypted. Accordingly, rehydrating data may include reversing such a process to restore the data (e.g. software update 159) to a usable state. For example, the restored software update 222 may include usable data (e.g. files) that may be tested and/or verified before being used to update one or more components of the isolated recovery system 102. In some embodiments, the restored software update 222 may include the original software update 159 received by the production backup system 101 from a third-party entity.

In some embodiments, a particular version (or instance, copy, etc.) of the software update may be restored based on a restore point (or time point) associated with a security threat. For example, if a security breach (e.g. successful injection of malicious code to the production backup system 101) occurred at time X, the software update selected from the set of immutable software update copies 215 may correspond to a time point prior to time X. As another example, the software update selected may correspond to a time point after time X. For instance, the software update may be transmitted after time point X, and accordingly, the system may perform various tests to the software update to address the particular security breach (e.g. malicious code).

As shown, the isolated recovery system 102 may validate the software update 223. The validation may include a second validation that is performed by the isolated recovery system 102. Accordingly, in some embodiments, the production backup system 101 may perform a first (or initial) validation of the software update 159, and the isolated recovery system 102 may perform a second (or subsequent) validation of the software update 159. The validation performed by the isolated recovery system 102 may be the same type (e.g. a repetition) of the validation performed by the production backup system 101, or may be a different type of validation. The validation performed by the isolated recovery system 102 may include any suitable method to ensure the software update 159 has not been altered in any way since being provided by the production backup system 101, and/or since being provided by the third-party provider. For example, the validation may include verifying a hash value (or other type of value) associated with the restored software update 222 with a hash value provided by the third-party provider of the software update 159. The validation may also include performing various forms of authentication associated with the software update 159 and/or the provider (e.g. third-party provider) from which the software update 159 was originally received. For example, the validation may include verifying a digital signature, certificate, credential, etc., or any other suitable method to validate the software update 159 originates from an authorized source (e.g. third-party provider).

As shown, the isolated recovery system 102 may apply the software update 224 to software components 230 of the isolated recovery system 102. In some embodiments, the software update may be applied in response to the isolated recovery system 102 performing a validation of the restored software update 222. In some embodiments, the software update may be applied to software components 230 within the sandboxed environment 220. The software components 230 may include software (e.g. applications), firmware, hardware, or combination thereof associated with the isolated recovery system 102. For example, the software components 230 may include components such as an application (e.g. recovery backup application) of a recovery (or standby) backup server, an operating system, security tools, a recovery VM (e.g. a VM that replicates a production VM of a source system), or any other components.

In some embodiments, the validated software update (or restored software update 222) may be tested and/or verified before being applied (or installed) to the software components 230. For example, the isolated recovery system 102 may perform various tests or verifications to ensure that the software update 159 performs correctly and has not already been comprised by various security threats, or potentially susceptible to such security threats.

In some embodiments, the software components 230 after being updated may be verified and/or tested within the secure environment 220. In addition, the software components 230 may be verified and/or tested within the secure environment 220 as if it were executing (or installed) in the production backup system 101 (or environment). For example, the isolated recovery system 102 may create a virtualization of the production backup system 101. In addition, the software component 230 may include a recreation (or virtualization) of a particular (e.g. specialized, customized, etc.) component of the production backup system 101 that may be associated with a particular user account (or customer, client, etc.) of a data backup and recovery service provided, at least in part, by the production backup system 101. For example, a critical software update 159 for a client system (e.g. source system 110) may first be applied and tested within the isolated recovery system 102 before being applied directly to the client system.

As described, the isolated recovery system 102 may include an automation manager 170 that coordinates a component update process. For example, the automation manager 170 may initiate a process to update components of the isolated recovery system 102. As described, the automation manager 170 may itself be contained within a secure environment (e.g. separate from the production environment), and therefore, secure from any malicious code that may have infiltrated production backup system 101. As described, the automation manager 170 may automate various operations performed within the isolated recovery system 102 and thereby may improve the overall efficiency and security of the component update process.

Accordingly, the isolated recovery system 102 may automate a component update process. Moreover, the configurations of some embodiments of the disclosure provide a mechanism not available in previous backup and data protection configurations in that the software update process may leverage existing processes (e.g. recovery processes) to securely inject a software update into the isolated recovery system 102.

Figure 3:
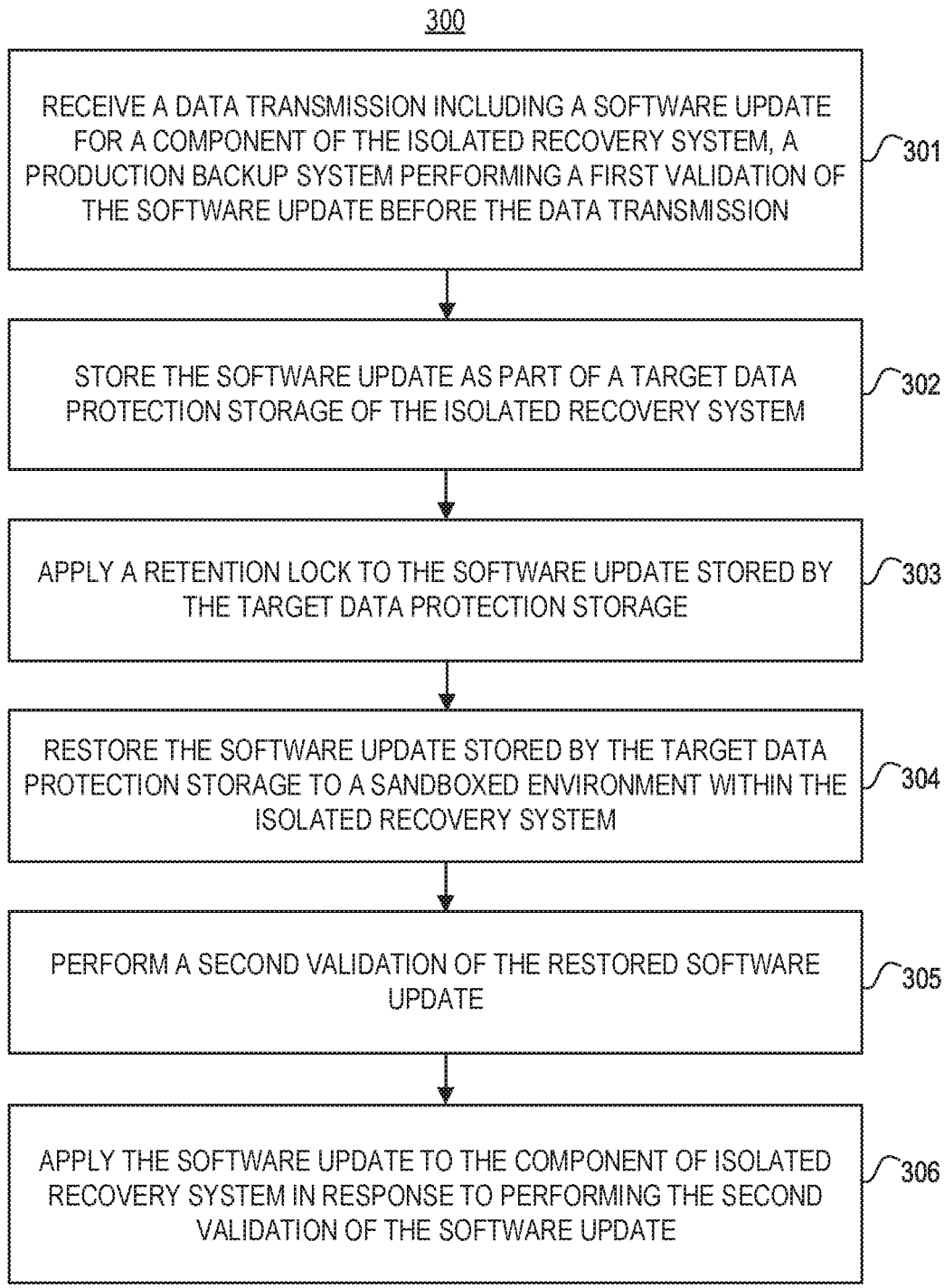
FIG. 3 is a flow diagram illustrating an example method of securely providing a software update to components of an isolated recovery system according to one or more embodiments of the disclosure.

FIG. 3 is a flow diagram illustrating an example method of securely providing a software update to components of an isolated recovery system according to one or more embodiments of the disclosure. Process 300 may use processing logic, which may include software, hardware, or a combination thereof. For example, process 300 may be performed by a system including one or more components described in operating environment 100 (e.g. automation manager 170, isolated recovery system 102, etc.).

In 301, the system may receive, from a production backup system (e.g. production backup system 101) and at an isolated recovery system (e.g. isolated recovery system 102), a data transmission. In some embodiments, the data transmission may include a software update (e.g. software update 159) for a component (e.g. software component 230) of the isolated recovery system. In some embodiments, the production backup system may perform a first validation of the software update before the data transmission.

In some embodiments, a target data protection storage (e.g. target data protection storage 210) of the isolated recovery system may store a copy of recovery data that is synchronized with recovery data stored by a source data protection storage (e.g. source data protection storage 205) of the production backup system. In addition, the data transmission may be performed via a data connection (e.g. data connection 165) that is used to synchronize recovery data between the production backup system and the isolated recovery system. For example, the data connection may include a particular replication port. Accordingly, in some embodiments, the data transmission may be performed as part of a process to synchronize the recovery data between the production backup system and the isolated recovery system. For example, the software update may be included with the recovery data as a payload of the data transmission. In some embodiments, the software update may be distinct from the recovery data that is used to synchronize the production backup system (e.g. the source data protection storage) and the isolated recovery system (e.g. the target data protection storage).

As described, in some embodiments, the system may rely on secure infrastructure to delivery (e.g. inject, provide, transmit, etc.) the software update to the isolated recovery system in a secure manner. For example, transferring data to the target data protection storage from a system external to the isolated recovery system may be limited (e.g. only granted) to the production backup system. As another example, writing data to the target data protection storage from a system external to the isolated recovery system may be limited to an operation that synchronizes the recovery data between the production backup system and the isolated recovery system. In addition, in some embodiments, access to the isolated recovery system from an external system (e.g. including the production backup system) may be limited to the data connection. As yet another example, access to the isolated recovery system from the production backup system may be limited to an operation that synchronizes the recovery data between the production backup system and the isolated recovery system.

In some embodiments, the system may perform an intelligent activation/deactivation of a data connection between the production backup system and the isolated recovery system. For example, the system may activate a data connection between the production backup system and the isolated recovery system. Once the data connection is activated, the system may initiate a transfer of data that delivers the software update to the isolated recovery system. In response to determining the transmission is complete, the system may deactivate the data connection between the production backup system and the isolated recovery system. Accordingly, the deactivation may prevent access to the isolated recovery system from the production environment. In addition, in some embodiments, activation/deactivation of the data connection may be based on the synchronization of recovery data. For example, the activation/deactivation of the data connection may be based on an operation used to synchronize the recovery data, and the software update may be included as part of the data included for the synchronization process.

In 302, the system may store the software update as part of the target data protection storage of the isolated recovery system. In some embodiments, the system may store the software update in response to identifying the data transmission includes the software update.

In 303, the system may apply a retention lock to the software update stored by the target data protection storage of the isolated recovery system. For example, the system may apply a retention lock to the software update to create immutable software update copies (e.g. immutable software update copies 215). The retention lock may ensure the software update persists for a predetermined time (or retention time). In some embodiments, applying the retention lock may include requiring a dual sign-on or verification procedure to perform administrative operations associated with the locked software update. For example, a dual sign-on (or verification) procedure may require a regular system administrator sign-on (or verification) plus a second authorized person (e.g. a "Security Officer") to perform certain administrative operations associated with the locked data. Accordingly, the dual sign-on requirement may ensure that certain administrative actions are under the purview and control of a higher authority above and beyond the system administrator.

In 304, the system may restore the software update to a sandboxed environment (e.g. sandboxed environment 220) within the isolated recovery system. In some embodiments, the sandboxed environment may include at least a secure partition within the isolated recovery system. In some embodiments, the system may perform, within the sandboxed environment and on the restored software update, one or more tests associated with a security threat. For example, the system may receive, from the production backup system, an indication of a security threat, and accordingly, the system may perform specific tests in response to a particular security threat.

In 305, the system may perform a second validation of the restored software update. As described, the production backup system may perform a first validation of the software update, and the isolated recovery system may perform a second (or subsequent) validation of the software update. The validation performed by the isolated recovery system may be the same type (e.g. a repetition) of the validation performed by the production backup system, or may be a different type of validation. The validation (e.g. first and/or second validation) may include any suitable method to ensure the software update is provided from an authorized source and has not been altered in any way since being provided, for example, by the third-party provider. In some embodiments, performing the first validation of the software update may include validating a signature associated with the software update and/or a hash value associated with the software update, and performing the second validation of the software update includes validating the signature and/or a hash value associated with the software update.

In 306, the system may apply the software update to the component (e.g. software component 230) of isolated recovery system. In some embodiments, the system may apply the software update in response to performing a second validation of the software update within the sandboxed environment, or in response to performing one or more tests on the software update. In some embodiments, applying the software update may include installing the software update to a component within the sandboxed environment. In some embodiments, the component of the isolated recovery system may be associated with a third-party entity that provides the software update to the production backup system. For example, the software component may require a critical update from the third-party entity that provides the software component (e.g. backup application, security tool, backup or recovery server application, etc.), and because the third-party may not directly access the isolated recovery system, the third-party entity may instead provide the software update to the production backup system that may act as an intermediary (e.g. using a recovery process or protocol).

In some embodiments, the system may automatically apply the software update to the component of the isolated recovery system. For example, as described, the software update may be provided as part of recovery data that is synchronized between the production backup system and the isolated recovery system. Accordingly, in some embodiments, the system may not be aware that a software update is included in a data transmission until an identification process is performed. Accordingly, upon determining a data transmission (or data within the target data protection storage) includes the software update, the system may automate the process to apply the software update. For example, the system may identify the target data protection storage includes the software update, and in response, automatically initiate (e.g. by an automation component of the isolated recovery system), the restoring of the software update to the sandboxed environment and the applying of the software update to the component of the isolated recovery system.

In addition, in some embodiments, the isolated recovery system may also provide the applied software update to the production backup system. For example, the software update may first be installed within the isolated recovery system and tested before being deployed to the production backup system to provide an additional layer of security and/or scrutiny of a third-party software update.

Accordingly, in some embodiments, the method may provide a secure process for delivering and applying software updates to components of a recovery system while minimizing the breadth of potential attack vectors to recovery infrastructure.

Figure 4:
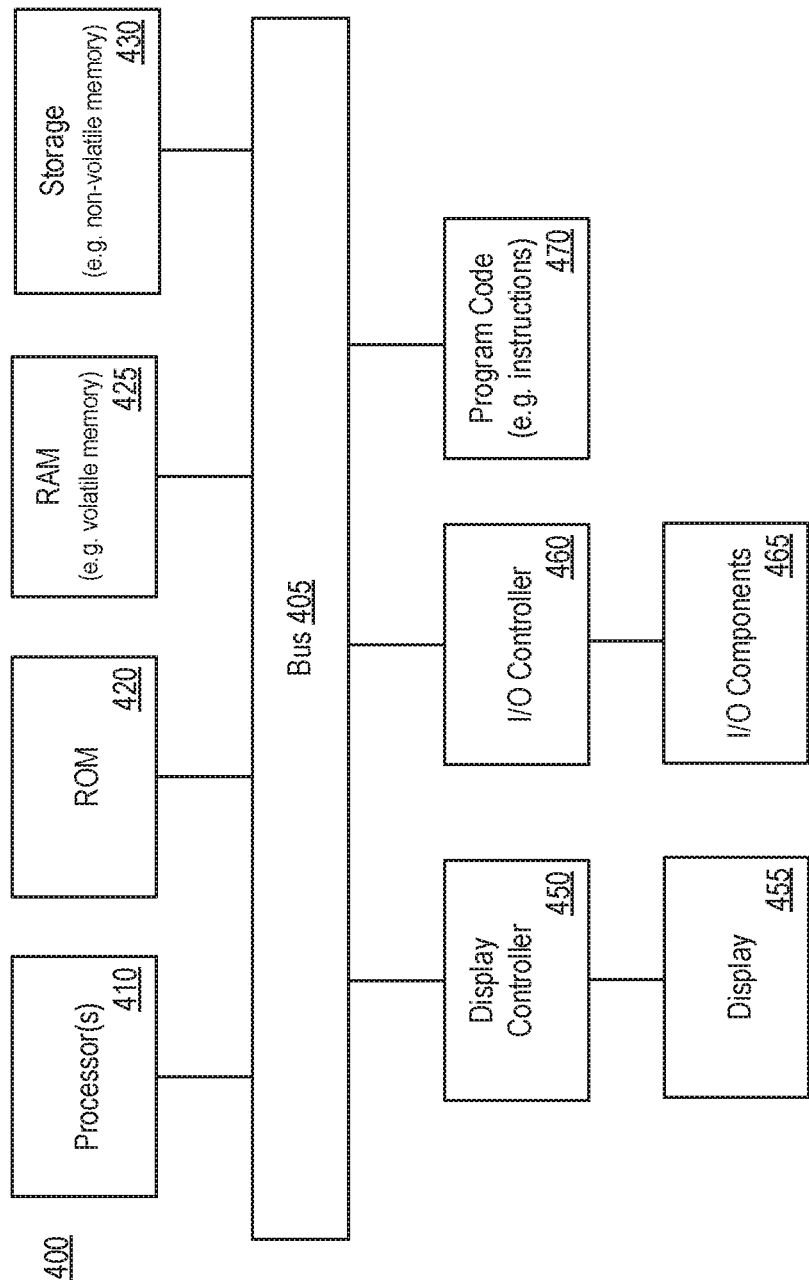
FIG. 4 is a block diagram illustrating an example of a computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g. automation manager 170, isolated recovery system 102, storage system 150, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g. automation manager 170, software update 159, software components 230). Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions, which when executed, cause the one or more processors to:
receive, from a production backup system and at an isolated recovery system, a data transmission including a software update for a component of the isolated recovery system, the production backup system performing a first validation of the software update before the data transmission;
store the software update as part of a target data protection storage of the isolated recovery system;
apply a retention lock to the software update stored by the target data protection storage of the isolated recovery system, comprising creating an immutable software update copy of the stored software update;
restore the software update stored by the target data protection storage to a sandboxed environment within the isolated recovery system using the immutable software update copy; and
apply the software update to the component of the isolated recovery system in response to performing a second validation of the software update within the sandboxed environment.

2. The system of claim 1, wherein the data transmission is performed as part of a process to synchronize recovery data between the production backup system and the isolated recovery system, and the software update is included with the recovery data as a payload of the data transmission, the software update being distinct from the recovery data that is synchronized.

3. The system of claim 1, wherein the target data protection storage stores a copy of recovery data that is synchronized with recovery data stored by a source data protection storage of the production backup system, and the data transmission is performed via a data connection that is used to synchronize recovery data between the production backup system and the isolated recovery system.

4. The system of claim 1, wherein the plurality of instructions, when executed, further cause the one or more processors to:
identify the target data protection storage includes the software update; and
automatically initiate, in response to identifying the target data protection storage includes the software update, the restoring of the software update to the sandboxed environment and the applying of the software update to the component of the isolated recovery system.

5. The system of claim 1, wherein performing the first validation of the software update includes validating a signature associated with the software update, and performing the second validation of the software update includes validating the signature and a hash value associated with the software update.

6. The system of claim 1, wherein access to the isolated recovery system from the production backup system is limited to an operation that synchronizes recovery data between the production backup system and the isolated recovery system.

7. The system of claim 1, wherein transferring data to the target data protection storage from a system external to the isolated recovery system is limited to the production backup system.

8. The system of claim 1, wherein the component of the isolated recovery system is associated with a third-party entity that provides the software update to the production backup system.

9. A method comprising:
receiving, from a production backup system and at an isolated recovery system, a data transmission including a software update for a component of the isolated recovery system, the production backup system performing a first validation of the software update before the data transmission;
storing the software update as part of a target data protection storage of the isolated recovery system;
applying a retention lock to the software update stored by the target data protection storage of the isolated recovery system, comprising creating an immutable software update copy of the stored software update;
restoring the software update stored by the target data protection storage to a sandboxed environment within the isolated recovery system using the immutable software update copy; and
applying the software update to the component of the isolated recovery system in response to performing a second validation of the software update within the sandboxed environment.

10. The method of claim 9, wherein the data transmission is performed as part of a process to synchronize recovery data between the production backup system and the isolated recovery system, and the software update is included with the recovery data as a payload of the data transmission, the software update being distinct from the recovery data that is synchronized.

11. The method of claim 9, wherein the target data protection storage stores a copy of recovery data that is synchronized with recovery data stored by a source data protection storage of the production backup system, and the data transmission is performed via a data connection that is used to synchronize recovery data between the production backup system and the isolated recovery system.

12. The method of claim 9, further comprising:
identifying the target data protection storage includes the software update; and
automatically initiating, in response to identifying the target data protection storage includes the software update, the restoring of the software update to the sandboxed environment and the applying of the software update to the component of the isolated recovery system.

13. The method of claim 9, wherein performing the first validation of the software update includes validating a signature associated with the software update, and performing the second validation of the software update includes validating the signature and a hash value associated with the software update.

14. The method of claim 9, wherein access to the isolated recovery system from the production backup system is limited to an operation that synchronizes recovery data between the production backup system and the isolated recovery system.

15. A computer program product comprising a non-transitory computer-readable medium having a computer-readable program code embodied therein to be executed by one or more processors, the program code including instructions to:
   receive, from a production backup system and at an isolated recovery system, a data transmission including a software update for a component of the isolated recovery system, the production backup system performing a first validation of the software update before the data transmission;
   store the software update as part of a target data protection storage of the isolated recovery system;
   apply a retention lock to the software update stored by the target data protection storage of the isolated recovery system, comprising creating an immutable software update copy of the stored software update;
   restore the software update stored by the target data protection storage to a sandboxed environment within the isolated recovery system using the immutable software update copy; and
   apply the software update to the component of the isolated recovery system in response to performing a second validation of the software update within the sandboxed environment.

16. The computer program product of claim 15, wherein the data transmission is performed as part of a process to synchronize recovery data between the production backup system and the isolated recovery system, and the software update is included with the recovery data as a payload of the data transmission, the software update being distinct from the recovery data that is synchronized.

17. The computer program product of claim 15, wherein the target data protection storage stores a copy of recovery data that is synchronized with recovery data stored by a source data protection storage of the production backup system, and the data transmission is performed via a data connection that is used to synchronize recovery data between the production backup system and the isolated recovery system.

18. The computer program product of claim 15, wherein the program code includes further instructions to:
   identify the target data protection storage includes the software update; and
   automatically initiate, in response to identifying the target data protection storage includes the software update, the restoring of the software update to the sandboxed environment and the applying of the software update to the component of the isolated recovery system.

19. The computer program product of claim 15, wherein performing the first validation of the software update includes validating a signature associated with the software update, and performing the second validation of the software update includes validating the signature and a hash value associated with the software update.

20. The computer program product of claim 15, wherein access to the isolated recovery system from the production backup system is limited to an operation that synchronizes recovery data between the production backup system and the isolated recovery system.

* * * * *